United States Patent
Mears et al.

(10) Patent No.: US 9,420,079 B2
(45) Date of Patent: Aug. 16, 2016

(54) METHOD AND APPARATUS FOR ASSOCIATING IMAGES WITH DATA

(75) Inventors: Mark Gilmore Mears, Boone, IN (US); Khelan Modi, Hamilton, IN (US)

(73) Assignee: Thomson Licensing, Issy-les Moulineaux (FR)

( * ) Notice: Subject to any disclaimer, the term of this patent is extended or adjusted under 35 U.S.C. 154(b) by 207 days.

(21) Appl. No.: 12/808,991

(22) PCT Filed: Dec. 19, 2007

(86) PCT No.: PCT/US2007/025954
§ 371 (c)(1),
(2), (4) Date: Jun. 17, 2010

(87) PCT Pub. No.: WO2009/078843
PCT Pub. Date: Jun. 25, 2009

(65) Prior Publication Data
US 2011/0123009 A1       May 26, 2011

(51) Int. Cl.
*H04M 1/57* (2006.01)
*H04M 1/2745* (2006.01)

(52) U.S. Cl.
CPC .......... *H04M 1/576* (2013.01); *H04M 1/27455* (2013.01)

(58) Field of Classification Search
CPC ...................... H04M 1/72552; H04M 1/72561; H04M 1/27455; H04M 1/576; H04M 1/72544; H04M 1/72583
USPC ............ 379/93.23, 67.1, 88.11, 88.12, 88.23, 379/100.01, 144.08, 412.1, 355.01; 725/51; 455/550.1; 345/169
See application file for complete search history.

(56) References Cited

U.S. PATENT DOCUMENTS 6,466,202 B1 * 10/2002 Suso ..................... G06F 1/1616
                                                                  345/169
7,046,994 B1    5/2006 Padawer et al.
(Continued)

FOREIGN PATENT DOCUMENTS

| CN | 1292615 | 4/2001 |
| EP | 0067748 | 7/1986 |

(Continued)

OTHER PUBLICATIONS

International Search Report, dated Jul. 24, 2008.
Koren Office Action dated Jun. 2, 2014.
Japanese Office Action dated Apr. 2, 2012.
Chinese Office Action dated May 7, 2014.

*Primary Examiner* — Md S Elahee
(74) *Attorney, Agent, or Firm* — Brian J. Dorini; Jerome G. Schaefer

(57) ABSTRACT

A method and apparatus used in communications devices for associating images with data is described. The method includes the steps of comparing data associated with a plurality of images with data associated with a record and linking an image from the plurality of images to the record if at least a portion of the data associated with the image matches at least a portion of the data associated with the record. The apparatus includes a memory for storing images and records and data associated with the images and records, a processor coupled to the memory for comparing the data associated with the records and data associated with a plurality of images, and a display coupled to the controller for displaying the image if at least a portion of the data associated with the image matches at least a portion of the data associated with the record.

27 Claims, 8 Drawing Sheets

(56) References Cited

U.S. PATENT DOCUMENTS

| | | | |
|---|---|---|---|
| 8,000,457 B2 * | 8/2011 | Harper | 379/100.01 |
| 2002/0094806 A1 | 7/2002 | Kamlmura | |
| 2004/0072589 A1 * | 4/2004 | Hamamura | H04B 1/3833 455/550.1 |
| 2005/0005294 A1 * | 1/2005 | Kojo et al. | 725/51 |
| 2005/0232247 A1 | 10/2005 | Whitley et al. | |
| 2006/0061810 A1 | 3/2006 | Choi et al. | |
| 2006/0171524 A1 * | 8/2006 | Tsuchiya | H04M 1/0214 379/355.01 |
| 2007/0120952 A1 | 5/2007 | Kim | |
| 2007/0206733 A1 | 9/2007 | Bennett | |
| 2007/0237312 A1 | 10/2007 | Guitarte Perez et al. | |

FOREIGN PATENT DOCUMENTS

| | | |
|---|---|---|
| JP | 4352279 | 10/1992 |
| JP | 06325092 | 11/1994 |
| JP | 11150597 | 6/1999 |
| JP | 200124776 | 1/2001 |
| JP | 2002176679 | 6/2002 |
| JP | 2005027349 | 1/2005 |
| JP | 2007060562 | 3/2007 |
| JP | 2007166397 | 6/2007 |
| JP | 2007318667 | 10/2007 |

* cited by examiner

METHOD AND APPARATUS FOR ASSOCIATING IMAGES WITH DATA

FIELD OF THE INVENTION

This application claims the benefit under 35 U.S.C. §365 of International Application PCT/US2007/025954, filed Dec. 19, 2007, which was published in accordance with PCT article 21 (2) on Jun. 25, 2009.

BACKGROUND OF THE INVENTION

Communications enhancement such as caller identification (CID) is a popular feature for telecommunications type devices. Conventional CID features typically display a caller's phone number and name (if available) upon receiving an incoming phone call from the caller. In this manner, CID enables a party receiving an incoming phone call to know the identity of the caller before answering the call, and may for example be used as a means by which parties can screen their calls.

Another form of CID involves displaying a picture or image corresponding to a caller upon receiving an incoming phone call from the caller. For example, certain cell phones provide an option whereby users can link a pre-stored cartoon image to a caller's phone book entry or CID entry. Thereafter, the pre-stored cartoon image is displayed upon receiving an incoming phone call from the caller. While this form of CID may be useful for indicating the identity of a caller, it has some associated problems. For instance, the user has to choose a picture to associate with the caller's phone book entry. The process of choosing a picture may be both time-consuming and tedious, particularly if a large number of pictures are available. Additionally, the process of choosing a picture may include the user further evaluating additional data, such as filenames and text, provided with the pictures or phone records in order to make a picture choice. The evaluation of the additional data further increases the time and effort involved in making the picture choice.

Accordingly, there is a need for a method and apparatus using communications enhancements such as CID that addresses the foregoing problems and thereby associates images with a record, such as phone record, in a manner that is less time-consuming and tedious. The present embodiments address these and/or other issues.

SUMMARY OF THE INVENTION

In accordance with an aspect of the present embodiments, a method is described that includes the steps of comparing data associated with a plurality of images with data associated with a record, and linking an image from the plurality of images to the record if at least a portion of the data associated with the image matches at least a portion of the data associated with the record.

In accordance with another aspect of the present embodiments, an apparatus is disclosed. According to an exemplary embodiment, the apparatus includes a memory for storing records and data associated with the records, a controller coupled to the memory for comparing the data associated with the records and data associated with a plurality of images, and a display coupled to the controller for displaying the image if at least a portion of the data associated with the image matches at least a portion of the data associated with the record.

According to another exemplary embodiment, an apparatus includes means for comparing data associated with a plurality of images with data associated with a record, means for selecting an image from the plurality of images if at least a portion of the data associated with the image matches at least a portion of the data associated with the record, means for displaying the picture, and means for associating the image to the record.

BRIEF DESCRIPTION OF THE DRAWINGS

The above-mentioned and other features and advantages of the present embodiments, and the manner of attaining them, will become more apparent and the embodiments will be better understood by reference to the following description taken in conjunction with the accompanying drawings, wherein.

The exemplifications set out herein illustrate preferred embodiments of the present disclosure, and such exemplifications are not to be construed as limiting the scope of the disclosure in any manner.

DESCRIPTION OF THE PREFERRED EMBODIMENTS

Figure 1:
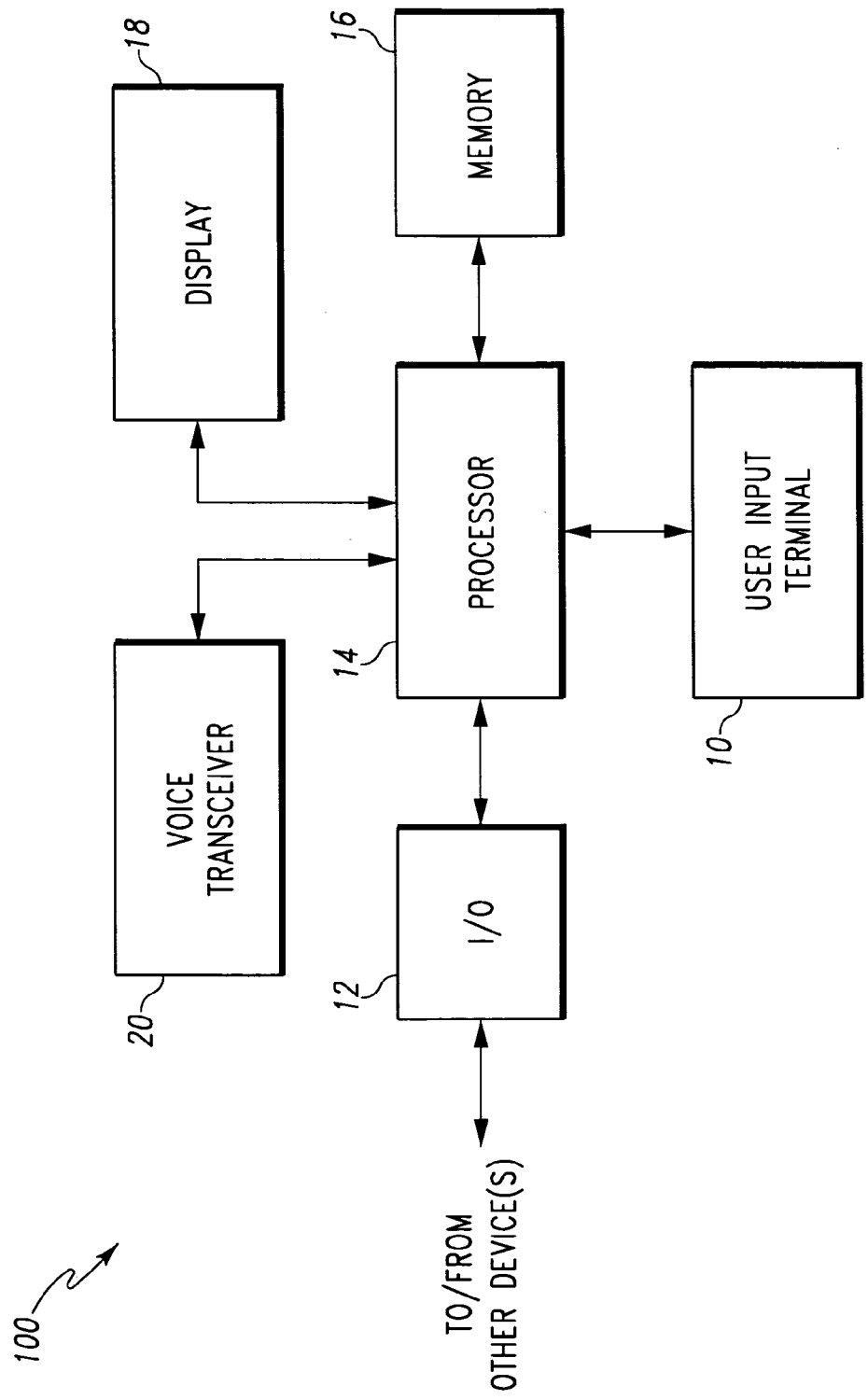
FIG. 1 is a block diagram of an exemplary embodiment of the present disclosure.

Referring now to the drawings, and more particularly to FIG. 1, a block diagram of an embodiment of a telecommunications apparatus 100 according to aspects of the present disclosure is shown. In general, a telecommunications apparatus may include but is not limited to a landline telephone type device, cellular telephone type device, or an internet type telephone device. As indicated in FIG. 1, telecommunications apparatus 100 comprises a user input terminal 10, I/O block 12, processor 14, memory 16, display 18, and voice transceiver 20. Some of the foregoing elements of telecommunications apparatus 100 may be implemented using one or more integrated circuits (ICs). For clarity of description, certain conventional elements associated with telecommunications apparatus 100 such as certain control signals, power signals and/or other elements may not be shown in FIG. 1. According to an exemplary embodiment, telecommunications apparatus 100 of FIG. 1 may be implemented as any type of device, system and/or apparatus having a telephonic communication capability, and may for example be integrated into devices, systems and/or apparatuses having other capabilities such as audio and/or video processing capabilities.

User input terminal 10 is operative to receive inputs from users, and to output signals corresponding to the user inputs to processor 14. According to an exemplary embodiment, user input terminal 10 may be implemented as a keypad having a plurality of keys that enable numeric and alphabetic input capabilities. User input terminal 10 may also include voice input capabilities. User input terminal 10 may for example be illuminated when in use (e.g., via light emitting diodes (LEDs) and/or other illumination means). User input terminal 10 allows user inputs for selecting various features such as selecting the image association or linking feature, selecting an image association or linking mode, and selecting one or more images from a set of images chosen based on a particular image linking mode.

I/O block 12 is operative to perform I/O functions of telecommunications apparatus 100. According to an exemplary embodiment, I/O block 12 is operative to transmit signals to and receive signals from other devices, systems and/or apparatuses in one or more different networks. I/O block 12 may include one or more antenna elements, plugs, and/or other types of I/O elements.

Processor 14 is operative to perform various signal processing and control functions of telecommunications apparatus 100. According to an exemplary embodiment, processor 14 is operative to execute software code that enables an image linking feature according to principles of the present disclosure. According to an exemplary embodiment, processor 14 enables display of images, such as still pictures or video frames, via display 18 in response to receiving an incoming communication, such as a phone call from a phone number, associated with the images. For example, processor 14 may include a manual image linking mode, a best set image linking mode, and a best choice image linking mode. Further, according to an exemplary embodiment, processor 14 enables image linking of images stored on telecommunications apparatus 100 or on a memory outside of telecommunications apparatus 100 to records stored on telecommunication apparatus 100. Processor 14 may also extract and compare portions of data associated with a set of images or with communications such as phone records. Further details regarding the image association or linking features of the present disclosure will be provided below.

Processor 14 is also operative to perform and/or enable functions of telecommunications apparatus 100 including detecting and processing user inputs made via user input terminal 10, reading and writing data from and to memory 16, performing call processing functions including dialing out and call receiving functions, enabling display of pictures and user interfaces via display 18, and/or other functions.

Memory 16 is operative to perform data storage functions of telecommunications apparatus 100. According to an exemplary embodiment, memory 16 stores data including executable software code, images (e.g., still pictures and/or moving pictures/video), on-screen display data, phone numbers including numbers of previously dialed calls and previously received calls, user setup data including data indicating associations between images and phone numbers, and/or other data.

Display 18 is operative to provide visual displays under the control of processor 14. According to an exemplary embodiment, display 18 provides visual displays of images, such as pictures or video frames, in response to receiving an incoming phone call from a phone number associated with the image or images. Display 18 may also be implemented as a touch-screen. In such a case, display 18 may include touch icons that correspond to one or more keys of user input terminal 10. Voice transceiver 20 is operative to transmit and receive voice data to and from processor 14 during phone calls.

Although the previous embodiment describes operation of a telecommunications device typically associated with a phone system, the descriptions of the inventive aspects of the embodiment may also apply to other communications devices. For example, a wireless handheld communications device may communicate in the form of electronic messages or electronic mail. Images may be linked to the senders of the electronic messages or mail using an image linking process described in the present disclosure. Pictures may then be displayed on the wireless handheld communications devices when a communication is received from the sender that is linked to the images.

Figure 2:
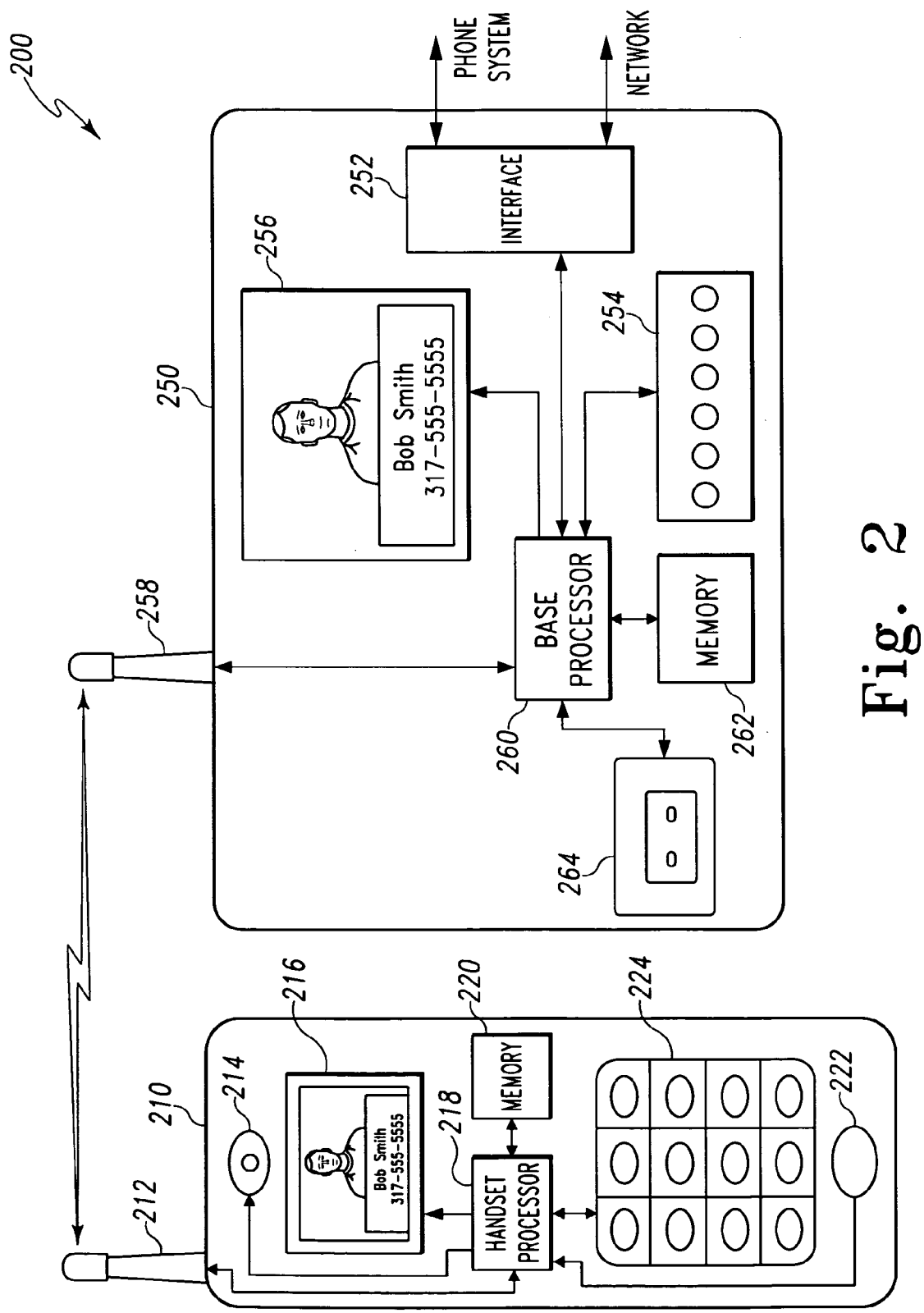
FIG. 2 is a block diagram of another exemplary embodiment of the present disclosure.

Referring now to FIG. 2, a block diagram of another embodiment of a telephone apparatus 200 according to aspects of the present disclosure is shown. Telephone apparatus 200 comprises two main blocks, a handset 210 and a base unit 250. Handset 210 includes an antenna circuit 212, earpiece 214, display 216, handset processor 218, memory 220, mouthpiece 222, and keypad 224. Base unit 250 includes interface circuit 252, user interface 254, display 256, antenna circuit 258, base processor 260, memory 264, and handset cradle 264. Some of the foregoing elements of telephone apparatus 200 may be implemented using one or more integrated circuits (ICs). For clarity of description, certain conventional elements associated with telephone apparatus 200 such as certain control signals, power signals and/or other elements may not be shown in FIG. 2.

Within handset 210, handset processor 218 connects to antenna circuit 212, earpiece 214, display 216, memory 220, mouthpiece 222, and keypad is 224. Handset processor 218 provides features similar to those features described above for processor 14, including receiving and transmitting of information, such as voice, video or data, through antenna circuit 212 as well as decoding user inputs from keypad 224. Handset processor 218 also translates and decodes between telephony signals and voice signals received from mouthpiece 222 and sent to earpiece 214 for the user. Handset processor 218 also decodes image or picture information that may be delivered through antenna circuit 212 or stored and retrieved in memory 220 and displayed on display 216. Handset processor 218 may also enable the selection of an image linking mode from a plurality of linking modes. Further, according to an exemplary embodiment, handset processor 218 enables image association of images stored in memory 220 or in a memory outside of telecommunications apparatus 200 to records stored in memory 220. Processor 218 may allow image association in one or more operating modes.

Within base unit 250, base processor 260 connects to interface 252, user interface 254, display 256, antenna circuit 258, memory 262, and handset cradle 264. Base processor 260 provides features similar to those features described above for processor 14, including receiving and transmitting of information, such as voice, video or data, through antenna circuit 259 as well as decoding user inputs from and providing user status to user interface 254.

It is important to note that only the base unit 250 or handset unit 210 may include a display element. For example, display 216 may not be present in handset 210. Only display 256 in base unit 250 may be present and capable of displaying pictures and other information. Additionally the display capabilities of display 216 in handset unit 210 and display 256 in base unit 250 may be different. For example, display 216 may be capable of displaying black and white text information such as a phone number. Display 256 may be capable of displaying color images, such as pictures or videos, as well as displaying other information related to the phone call.

It is also important to note that functions performed by base processor 260 and handset processor 218 as described here may compliment as well as overlap each other. For instance, base processor 260 may include a circuit such as a display controller that enables display of images on one or both of display 216 and display 256. Handset processor 218 may include only a display control circuit that is responsive to the display controller in base processor 260. Additionally, base processor 260 may include circuitry for storing and retrieving pictures from memory 262 and extracting or generating keywords based on data retrieved and associated with the pictures. Handset processor 218 may include circuitry for storing and retrieving records from memory 220 and send the keywords to base unit 250. Base processor 260 may include additional circuitry for comparing the keywords for the pictures to the keywords for the records.

Additionally, any or all of the aspects of the present disclosure regarding image linking may be included as executable code in base processor 260, handset processor 218, or both. In an exemplary embodiment, base processor is a microprocessor executing software code capable of one or more modes of linking images to records, including comparing potions of data associated with images to portions of data associated the record. Equally, in another embodiment, handset processor could be a microprocessor capable of executing similar software code.

Base processor 260 also decodes and controls signals received or sent through interface 252. Interface 252 provides an interface for signals to and form external devices and networks. In a preferred embodiment, interface 252 provides an interface to a standard telephone line call system for voice calling and also provides an interface to a computer or internet network for transfer of data. Base processor 260 also decodes image information that may be delivered through antenna circuit 258, delivered through interface 252 or stored and retrieved in memory 262 and displayed on display 256.

Handset cradle 264 provides a stationary storage location for handset 210, for instance, when it is not in use. Handset cradle 264 may include connections that interface to connections on handset 210, not shown, for recharging of the battery power device in handset 210 or direct data communications between handset 210 and base unit 250. Base unit 250 may also include power supply circuits, not shown, for connecting to an electrical power outlet and powering the base unit as well as charging handset 210.

Wireless communications is established at the handset 210 through is antenna circuit 212 and at the base unit 250 through antenna circuit 258. A communications protocol between handset 210 and base unit 250 in order to transfer voice information from the phone line connected to interface 252 to the user of handset 210. In a preferred embodiment, the communications protocol complies with the Digital Enhanced Cordless Telecommunications (DECT) 6.0 standard and permits separate transfer of voice information and data corresponding to video or control information. Both handset 210 and base unit 250 may also be capable of communicating on other wireless communications networks such as a wireless local area network (WLAN) or a cellular phone network.

Figure 3:
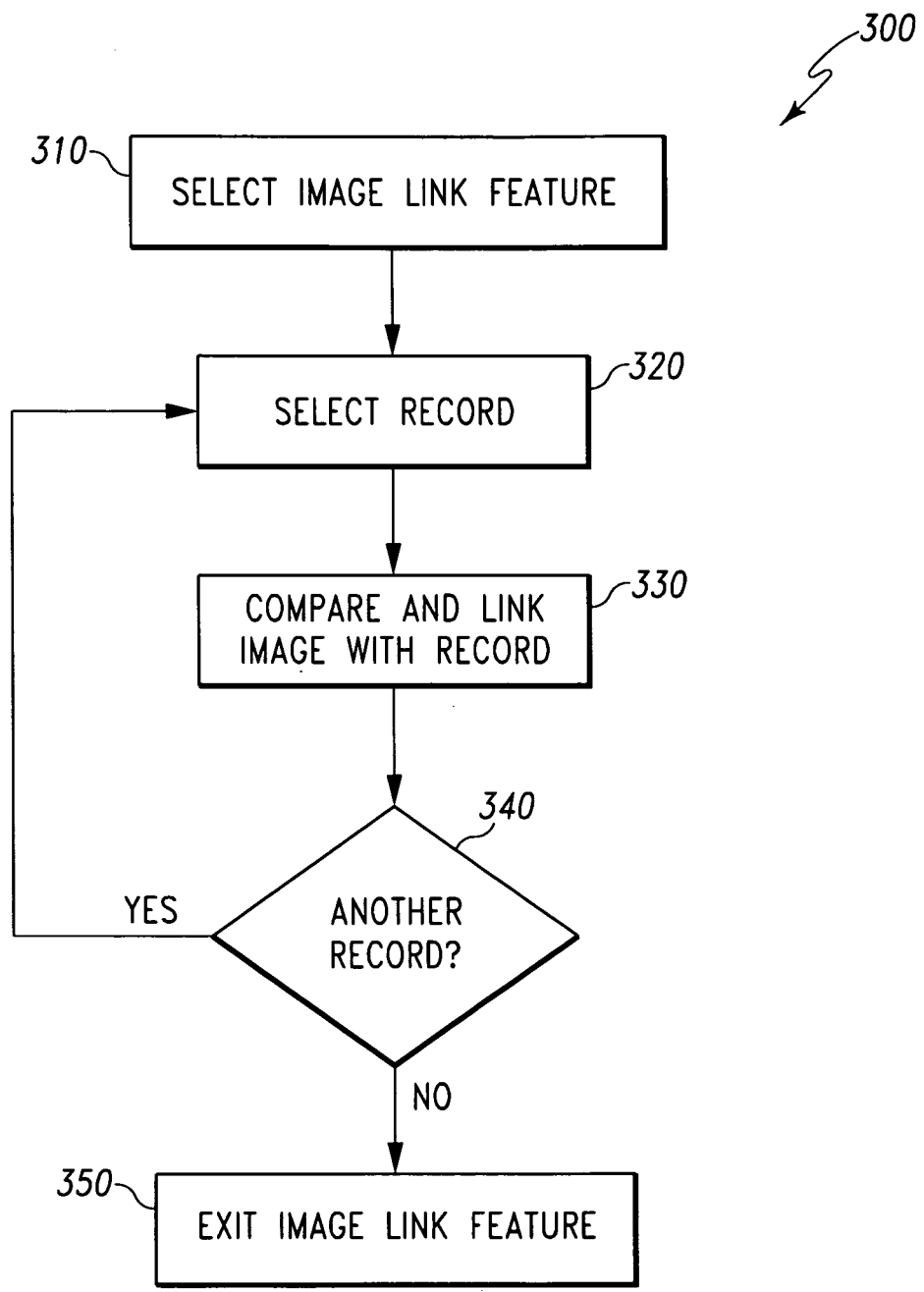
FIG. 3 is a flowchart illustrating a process for setting up an image linking feature according to an exemplary embodiment of the present disclosure.

Referring now to FIG. 3, a flowchart illustrating the steps of a process 300 for setting up an image linking feature according to an exemplary embodiment of aspects of the present disclosure is shown. For purposes of example and explanation, process 300 will be described primarily with reference to telecommunications apparatus 100 of FIG. 1. Process 300 may equally be described using embodiments such as telephone apparatus 200 in FIG. 2. The steps in process 300 are exemplary only, and are not intended to limit the present disclosure in any manner. Additionally, the steps illustrated in process 300 may be performed using an external electronics device such as a computer. The results from step 330, described below, may then be transferred to telecommunications apparatus 100 or telephone apparatus 200 using a communications network such as a network or internet connection.

At step 310, a user selects the image linking feature. According to an exemplary embodiment, the user may select the image linking feature at step 310 by providing one or more inputs via user input terminal 10 responsive to an on-screen menu provided via display 18 which lists a number of available features provided by telecommunications apparatus 100.

After the user selects the image linking feature at step 310, process flow advances to step 320 where the user selects a record. According to an exemplary embodiment, the user may select the record at step 310 by providing one or more inputs via user input terminal 10 responsive to an on-screen menu provided via display 18 which lists a number of individual callers. The individual records may be listed as stored CID records from previously received calls, or may be listed as entries in a phone book feature of telecommunications apparatus 100 which includes the names, phone numbers and/or other information associated with individual callers. Entries in the phone book may for example be manually entered by the user and stored in memory 16 during another set-up process for telecommunications apparatus 100 which will not be described herein.

After the user selects the record at step 320, process flow advances to step 330 where images are identified as, or determined to be, associated with or linked to the record. According to an exemplary embodiment, association or linking of the images with the record at step 330 may be done under the control of processor 14 by providing one or more user inputs via user input terminal 10 in response to images displayed via display 18. The selected images may be stored in the local memory (i.e., memory 16) of telecommunications apparatus 100 and/or in a memory of another device that is operatively coupled to telecommunications apparatus 100 via I/O block 12. For instance, the selected images may be stored on a computer that is connected to the telecommunications apparatus 100 and/or stored in a repository located on the internet. The selected images may also be contained within one or more "containers" of images (e.g., folders, hard drives, etc.). Moreover, the selected plurality of images may represent still pictures and/or a video sequence of moving pictures. As referred to herein, the term "image" may refer to any type of pictures including photographs and/or graphical file images. Details regarding the process of association will be described in more detail below.

In addition to selecting images for storage, the user may also select images and communicate or transmit the selected pictures between a handset 210 and base unit 250 of a telephone apparatus 200 as shown in FIG. 2. For example, one image may be selected and transmitted from the base unit 250 to the handset 210 for display on display 216 located on the handset 210. The selected image may be used for display on the handset for receiving an to incoming call, and may be different than images selected for display on display 256 located on base unit 250 of telephone apparatus 200. In another example, images may also be received through handset 210 and transmitted to base unit 250 for storage and future display.

During the image linking process of step 330, the user may be given an opportunity to modify a parameter of one or more of the selected images. For instance, parameters for cropping, shading, and resizing, along with other known picture parameters may be modified. Also during the image linking process of step 330, the user may be given an opportunity to select the manner in which the selected images are displayed when an incoming communication, such as a phone call from the corresponding phone number, is received by telecommunications apparatus 100. For example, the user may designate that the selected images be displayed as a slide show. The slide show may display the images one at a time in a rotating manner. The pictures may also be displayed all at once in a full screen mode, or as a mosaic of some or all of the selected images where "thumbnails" of the pictures can be of equal or unequal sizes, with any number of transition effects and/or different angular display orientations. In this manner, the user may select a temporal order that one or more of the selected pictures is displayed and/or may select a time period that one or more of the selected pictures is displayed. As another example, the user may designate that certain ones of the selected pictures are displayed first in a selected order, and that thereafter, the remaining selected pictures are displayed randomly. As yet another example, the user may designate that certain ones of the selected images are displayed for longer or shorter time periods than other selected images. An advantage of displaying certain pictures in different forms and in different time frames may improve both the visual appeal of the display as well as improve the functional benefit such as reducing the effect of image burn-in on the display.

Also during the image linking process of step 330, the user may be given an opportunity to designate where the selected images are to be displayed when an incoming communication, such as a phone call from the corresponding phone number, is received by telecommunications apparatus 100. For example, the user may designate that some or all of the selected images are displayed via display 18 of telecommunications apparatus 100 and/or via one or more other devices (e.g., base station 250, a computer monitor, a television screen, etc.). Data corresponding to all of the user's selections at step 330 are stored in memory 16.

After the user associates or links images with the record and provides is any other input selections, at step 330, process flow advances to step 340. At step 340 the user is given an opportunity to select another record. If the user chooses to select another record at step 340, process flow loops back to step 320 where another record is selected. Thereafter, images are identified as, or determined to be, associated or linked with the record at step 330, as previously described above. Alternatively, if the user chooses not to select another record at step 340, process flow advances to step 350 where the user exits the image linking feature by providing one or more inputs to telecommunications apparatus 100 via user input terminal 10.

It is noted that the steps of FIG. 3 may be varied in accordance with design choice. For example, the user may be given the opportunity to select images to be associated with a given call record (i.e., step 330 in FIG. 3 as shown) before actually selecting the call record (i.e., step 320 in FIG. 3 as shown).

Figure 4:
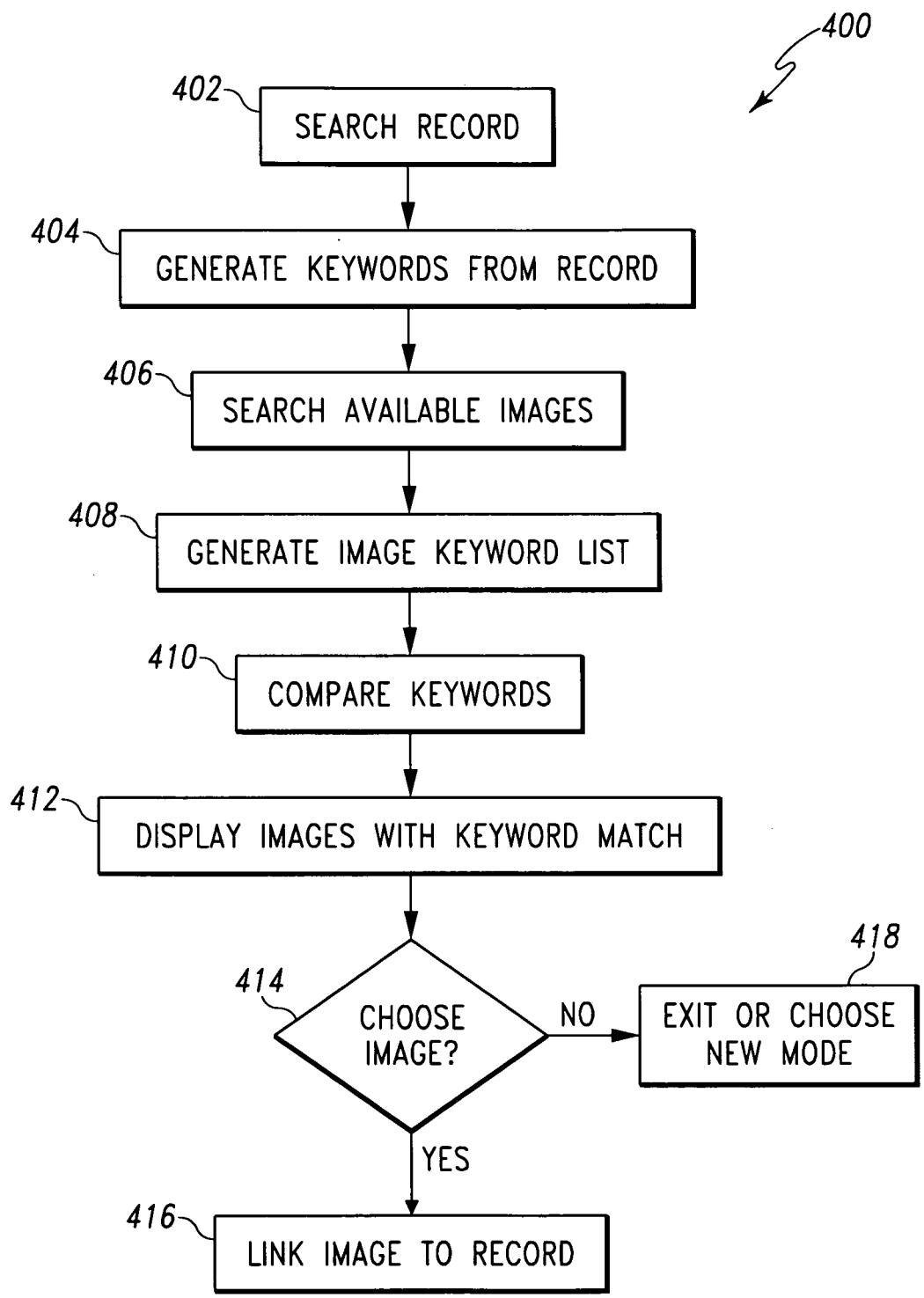
FIG. 4 is a flowchart illustrating a process for linking images with records according to an exemplary embodiment of the present disclosure.

Referring now to FIG. 4, a flowchart illustrating a process 400 for executing a mode of linking an image to a record according to an exemplary embodiment of aspects of the present disclosure is shown. Process 400 is exemplary of a method of implementing the linking step 330 in FIG. 3. Process 400 may be referred to as a best set linking mode and is characterized by comparing and selecting of a group of images where at least one portion of data associated with the selected images matches at least one portion of data associated with the record.

At step 402, the information regarding the selected record is searched and analyzed. The search and analysis may be done by a processor such as processor 14 or any other arithmetic analysis circuit. In an exemplary embodiment, Information stored and associated with the record may include the phone number, an area code, the name of the caller, and the filename. Any information associated with the communication record may be searched and analyzed.

Next, at step 404, a keyword list is generated based on the searched and analyzed information from the record. The keyword list for the record represents a bounded list of words that may improve the ability to compare and achieve a match between images and records. The keyword generation may be done by a processor such as processor 14 or any other arithmetic analysis circuit as described earlier. It is important to note that several approaches may be used to generate the key word list. In an exemplary embodiment the keyword list is a list of words containing identified names, places, and dates from the record. The keyword list may also include metadata for the record, such as data that was automatically entered with the record at the time of storing the record.

At step 406, the information regarding the selected record is searched and analyzed. The search and analysis may be done by a processor such as processor 14 or any other arithmetic analysis circuit as described earlier. In an exemplary embodiment, information may include the filename of the image file, the date the image was stored or modified, and any metadata that may have been included automatically with storing the image or included manually by used input. Any information associated with the communication record may be searched and analyzed.

Next, at step 408, a keyword list is generated based on the information from the images stored. The keyword list for the images represents a list of words that may improve the ability to compare and achieve a match between pictures and records. The keyword generation may be done by a processor such as processor 14 or any other arithmetic analysis circuit as described earlier. It is important to note that several approaches may be used to generate the key word list. In an exemplary embodiment the keyword list is a list of words containing identified names, places, and dates from the record or any metadata, such as data automatically stored with the storing of the image. Each image will have one or more keywords associated with the picture based on the analysis of the associated information.

After the keyword lists are generated for the record at step 404 and pictures at step 408, the process continues to step 410. At step 410 the keyword list for the record and the keyword list from the images are compared one picture at a time. Next, at step 412, based on the comparison results a set of images is displayed. In an exemplary embodiment, all of the images having at least one associated keyword that matches a keyword associated with the record are displayed on a display such as 18. In another exemplary embodiment, all of the images are displayed as described above. However, for example, if more than five pictures have at least one match, then only the five images with the largest number of matches is displayed. By limiting the number of pictures displayed, experience of using the linking pictures can be limited and useful.

Next, at step 414, one or more pictures are chosen from the set of pictures displayed in step 412. If at step 414, at least one image is chosen from the set of images displayed then, at step 416, based on being chosen in step 414 the image is linked to the record. Alternatively, all of the images from the set of images displayed in step 412 may be chosen in step 414 and linked to the record.

If at step 414, no image is chosen, then at step 418 the process is exited. Alternatively, at step 418 the process may proceed to a different linking mode. A different linking mode may include a mode for selecting a image from all of the available pictures regardless of a keyword match.

Figure 5:
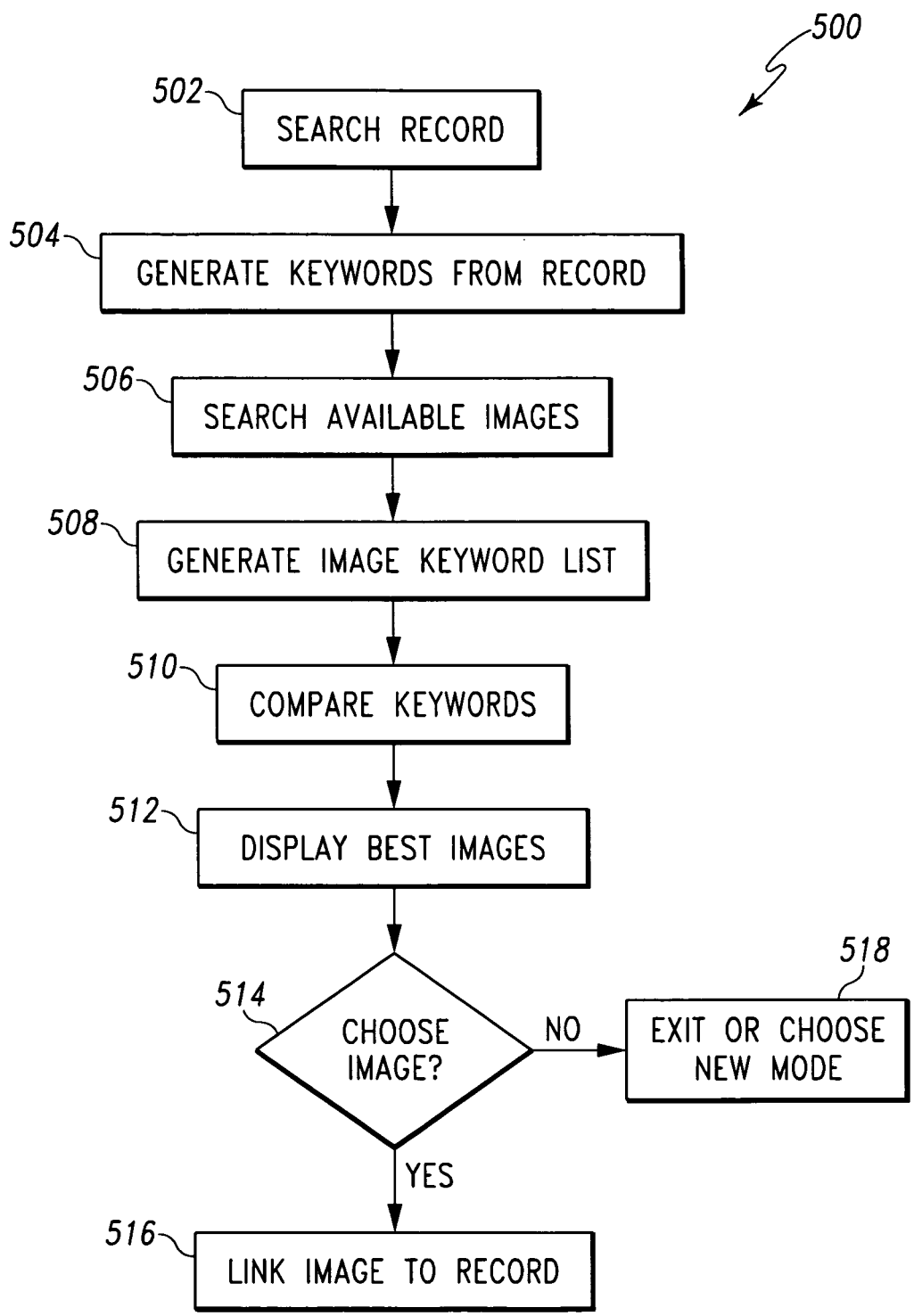
FIG. 5 is a flowchart illustrating another process for linking images with records according to an exemplary embodiment of the present disclosure.

Referring now to FIG. 5, a flowchart illustrating a process 500 for executing another mode of linking a image to a record according to an exemplary embodiment of aspects of the present disclosure is shown. Process 500 is exemplary of a method of implementing the linking step 330 in FIG. 3. Process 500 may be referred to as a best choice linking mode and is characterized by comparing and selecting the one image having the largest portion of data associated with the selected image matching a portion of data associated with the record.

Steps 502, 504, 506, 508, and 510 are similar to steps 402, 404, 406, 408, and 410 described in FIG. 4 and will not be further described here. At step 512, based on the comparison results in step 510, the image containing best match of keywords to the keywords associated with the record is determined and displayed. In an exemplary embodiment, the best match is determined as the image having the largest number of keywords that match the keywords associated with the record.

Next, at step 514, the image, determined as the best match image, is chosen based on being displayed in step 512. If at step 514, the image is chosen as displayed then, at step 516, based on being chosen in step 514 the image is linked to the record.

If at step 514, the image is not chosen, then at step 518 the process is exited. Alternatively, at step 518 the process may proceed to a different linking mode. A different linking mode may include a mode for selecting an image from all of the available images regardless of a keyword match.

Figure 6:
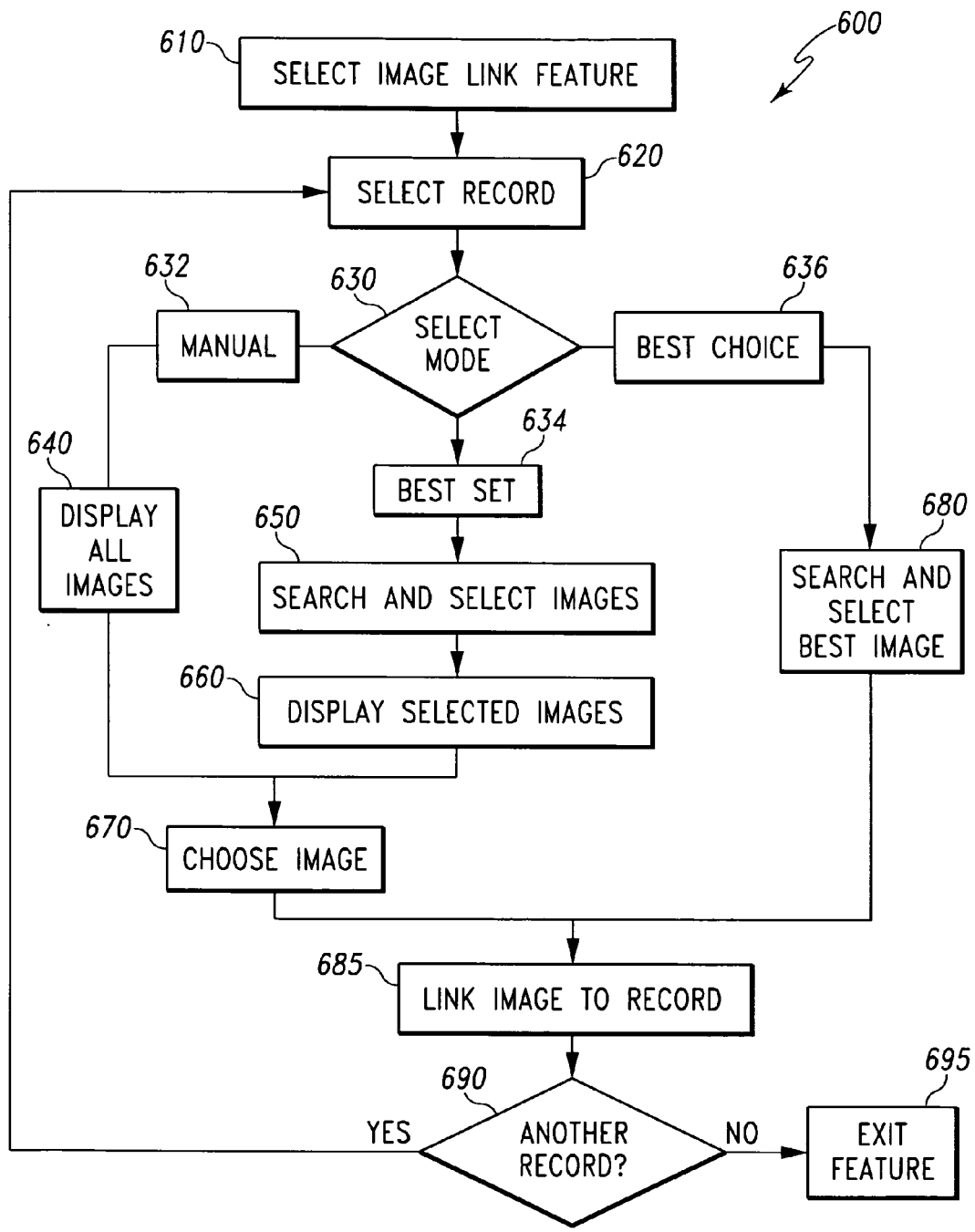
FIG. 6 is a flowchart illustrating another process for setting up an image linking feature according to an exemplary embodiment of the present disclosure.

Referring now to FIG. 6, a flowchart illustrating steps of a process 600 for executing an imagee linking feature according to another exemplary embodiment of aspects of the present disclosure is shown. For purposes of example and explanation, process 600 will also be primarily described with reference to telecommunications apparatus 100 of FIG. 1. Process 600 may equally be described using embodiments such as telephone apparatus 200 in FIG. 2. The steps of process 600 are exemplary only, and are not intended to limit the present disclosure in any manner. Additionally, the steps described in process 600 may be performed using an external electronics device such as a computer. The results from step 685, shown below, may then be transferred to telecommunications apparatus 100 or telephone apparatus 200 using a communications network such as a network or internet connection.

At step 610, a user selects the image linking feature. According to an exemplary embodiment, the user may select the image linking feature at step 610 by providing one or more inputs via user input terminal 10 responsive to an on-screen menu provided via display 18 which lists a number of available features provided by telecommunications apparatus 100.

After the user selects the image linking feature at step 610, process flow advances to step 620 where the user selects a record. According to an exemplary embodiment, the user may select a phone call record at step 610 by providing one or more inputs via user input terminal 10 responsive to an on-screen menu provided via display 18 which lists a number of individual callers. The individual call records may be listed as stored CID records from previously received calls, or may be listed as entries in a phone book feature of telecommunications apparatus 100 which includes the names, phone numbers and/or other information associated with individual callers. Entries in to the phone book may for example be manually entered by the user and stored in memory 16 during another set-up process for telecommunications apparatus 100 which will not be described herein.

After the user selects the record at step 620, process flow advances to step 630 where the user selects a mode for linking images with records. According to an exemplary embodiment, the user may select the mode of linking or association by providing one or more inputs via user input terminal 10 responsive to an on-screen menu provided via display 18. Additionally, one particular association mode may be chosen as a default association mode.

If, at step 630, the mode of linking is identified or selected as manual mode at step 632, then the process proceeds to step 640 where all the images available are displayed. The images may be retrieved from any memory source as described previously or retrieved from an external location accessible over a network or internet connection. The images may be displayed in a convenient display format such as thumbnails and may further be organized on pages or in folders.

If, at step 630, the mode of association is identified or selected as best choice mode at step 634, then the process proceeds to step 650 where an information search, keyword generation, and picture selection process based on a best set linking is performed such as described by steps 402-410 in FIG. 4.

After a comparison of keywords between the record and the images has been completed as part of the linking step 650 then, at step 660 the best set of images is displayed. The images may be displayed in a convenient display format such as thumbnails and may further be organized on pages or folders.

After the display step 640 in the manual linking mode or the display step 660 in the best choice liking mode, the process continues to step 670. At step 670, displayed images are chosen.

If, at step 630 the mode of association is identified or selected as best choice mode at step 636, then the process proceeds to step 680 where an information search, keyword generation, and image selection process based on a best choice linking is performed such as described by steps 502-510 in to FIG. 5. It is important to note that the best choice image may be selected and linked automatically to the record without further interaction, including interaction with the user.

Next, at step 685, any images chosen at step 670 or the best choice image from step 680 are identified as associated with or linked to the record. According to an exemplary embodiment, linking of the images with the record at step 685 may be done under the control of processor 14 by providing one or more user inputs via user input terminal 10 in response to images displayed via display 18. The selected images may be stored in the local memory (i.e., memory 16) of telecommunications apparatus 100 and/or in a memory of another device that is operatively coupled to telecommunications apparatus 100 via I/O block 12. For instance, the selected images may be stored on a computer that is connected to the telecommunications apparatus 100 and/or stored in a repository located on the internet. The selected images may also be contained within one or more containers of images (e.g., folders, hard drives, etc.). Moreover, the selected plurality of images may represent still pictures and/or a video sequence of moving pictures. As referred to herein, the term images may refer to any type of pictures including photographs and/or graphical file images.

In addition to selecting images for storage based on linking the images to records, the user may also select images and communicate or transmit the selected images between a handset 210 and base unit 250 of a telephone apparatus 200 as shown in FIG. 2. For example, one image may be selected and transmitted from the base unit 250 to the handset 210 for display on display 216 located on the handset 210. The selected image may be used for display on the handset for receiving an incoming call, and may be different than images selected for display on display 256 located on base unit 250 of telephone apparatus 200. In another example, images may also be received through handset 210 and transmitted to base unit 250 for storage and future display.

During the image linking at step 685, the user may be given an opportunity to modify a parameter of one or more of the selected images. For instance, parameters for cropping, shading, and resizing, along with other known image parameters may be modified as described earlier. Also during the image linking at step 685, the user may be given an opportunity to select the manner in which the selected images are displayed when, for instance, an incoming phone call from the corresponding phone number is received by telecommunications apparatus 100 or to designate where the images are displayed on a device such as telephone apparatus 200 as described earlier.

After the user associates or links images with the communications record and provides any other input selections at step 685, process flow advances to step 690 where the user is given an opportunity to select another record. If the user chooses to select another record at step 690, process flow loops back to step 620 where another record is selected. Thereafter, one or more images are linked with the record based on a selected mode, as previously described above. Alternatively, if the user chooses not to select another record at step 690, process flow advances to step 695 where the user exits the image linking feature by providing one or more inputs to telecommunications apparatus 100 via user input terminal 10.

It should be noted that the steps of FIG. 6 may be varied in accordance with design choice. For example, the user may be given the opportunity to select images to be associated linked with a given record before actually selecting the record.

Figure 7:
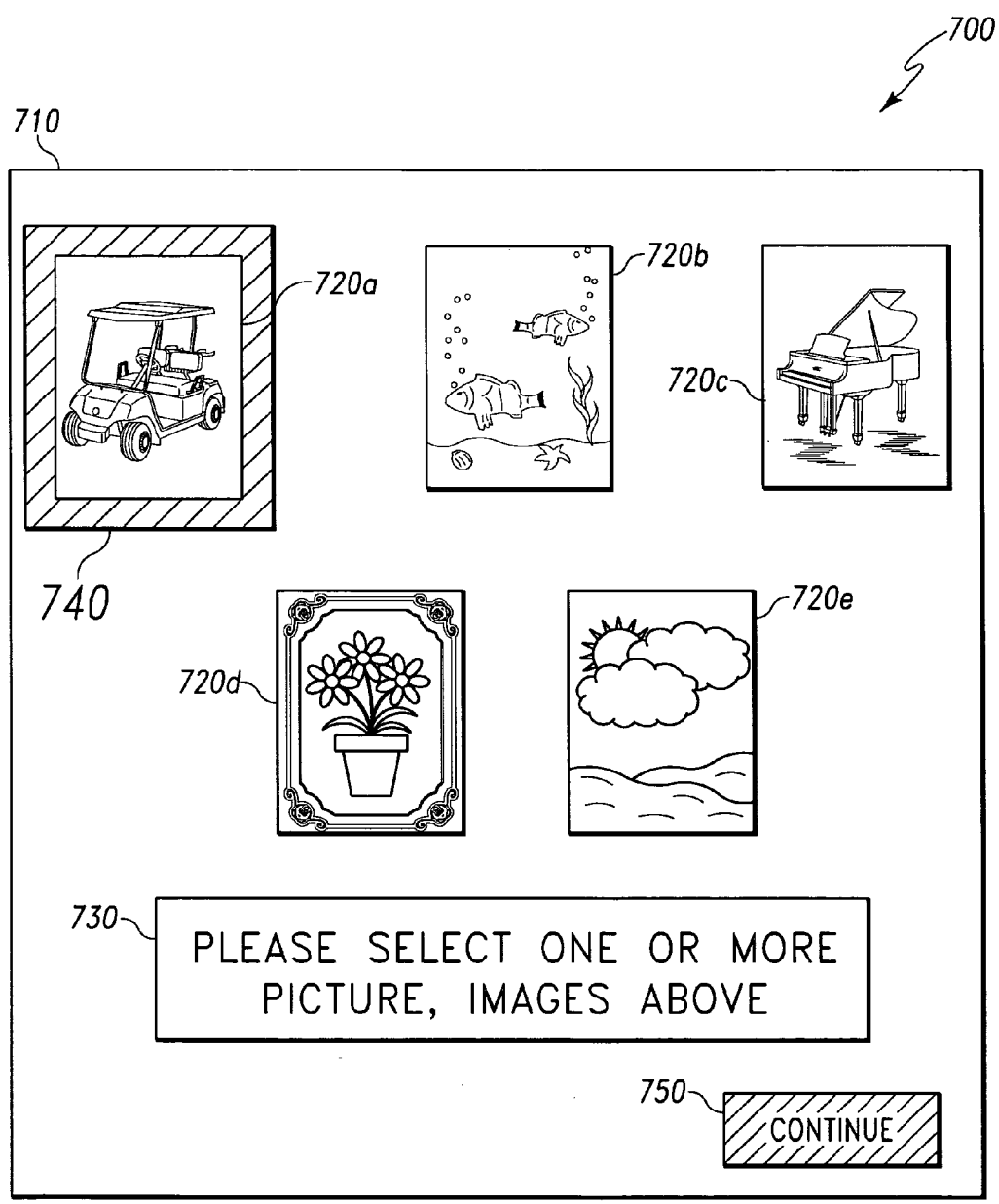
FIG. 7 is a diagram illustrating a user interface used with an image linking feature according to an exemplary embodiment of the present disclosure.

Referring now to FIG. 7, a diagram illustrating a user interface display 700 used with an image linking feature according to an exemplary embodiment of the present disclosure is shown. User interface display 700 may be shown as part of a complete user interface using the display element of the communications device such as display 18 in FIG. 1 or display 256 in FIG. 2. User interface display 700 may correspond to an initial image or picture display step such as shown in step 412 in FIG. 4, step 512 in FIG. 5, or step 660 in FIG. 6.

A display window 710 includes a set of picture images 720a-720e chosen during an initial image comparing step such as described previously. Picture images 720a-720e may be displayed in several forms including displaying as thumbnails. Picture images 720a-720e may also include display of data or keywords associated with each image. It is important to note that the number of picture images displayed in display window 710 may be dependent on the mode of linking images that is used. A command line 730 is used to prompt a user to select one or more of the picture images 720a-720e. A highlight window 740 is placed over one of the picture images 720a-720e. Highlight window 740 can be moved from picture image to picture image and pictures selected based on the displayed picture images by using buttons on the communications device such as user input terminal 10 on telecommunications apparatus 100. It is important that other forms of images other than picture images may be displayed in place of picture images 720a-720e.

A "continue" icon 750 is also displayed in display window 710. Highlight window 740 may also be moved and placed over continue icon 750. Selecting continue icon 750 exits activities related to user interface display 700 and moves to the next aspect of the user interface and image linking process. It is important to note that if the continue box 750 is selected before any images are selected based on picture images 720a-720e then no images are chosen for linking to the communications record.

Figure 8:
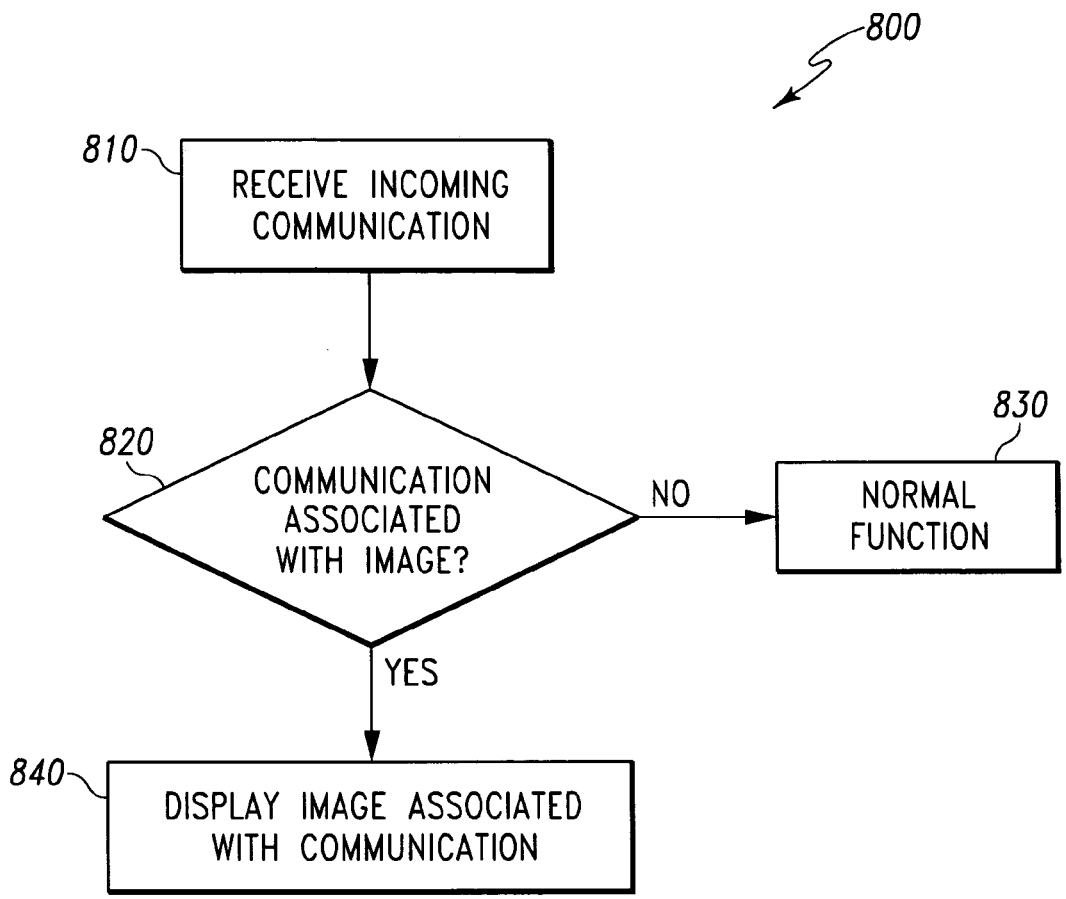
FIG. 8 is a flowchart illustrating steps for executing an image display feature according to an exemplary embodiment of the present disclosure.

Referring now to FIG. 8, a flowchart illustrating steps of a process 800 for executing an image linking feature according to an exemplary embodiment of aspects of the present disclosure is shown. For purposes of example and explanation, process 800 will also be primarily described with reference to telecommunications apparatus 100 of FIG. 1. Process 800 may equally be described using embodiments such as telephone apparatus 200 in FIG. 2. The steps of process 800 are exemplary only, and are not intended to limit the present disclosure in any manner.

At step 810, telecommunications apparatus 100 receives an incoming communication. The communication includes information regarding the sender of the communication. The sender information is located or stored as a record in telecommunications apparatus 100. According to an exemplary embodiment, the incoming phone call includes CID information which indicates the caller's phone number and is detected by processor 14.

Next, at step 820, a determination is made as to whether the information about the sender received with the communication, such as the caller's phone number, is associated with one or more images. According to an exemplary embodiment, processor 14 makes the determination at step 820 by comparing the received CID information with data stored in memory 16 to from the set-up process for the image linking feature described in FIG. 3 or FIG. 6.

If the determination at step 820 is negative, process flow advances to step 830 where telecommunications apparatus 100 provides a display function in a normal manner under the control of processor 14. According to an exemplary embodiment, providing the display function in a normal manner at step 830 includes displaying the caller's phone number, but does not include displaying a plurality of images associated with the caller.

Alternatively, if the determination at step 820 is positive, process flow advances to step 840 where telecommunications apparatus 100 displays images associated with the communication. According to an exemplary embodiment, images linked to a caller's phone number are displayed under the control of processor 14 in accordance with the user selections made during step 830 of the set-up process for the image linking feature described in FIG. 3 or FIG. 6. The images displayed at step 840 may be stored in and retrieved from the local memory (i.e., memory 16) of telecommunications apparatus 100 and/or in a memory of another device that is operatively coupled to telecommunications apparatus 100 via I/O block 12. By allowing images to be stored other than in telecommunications apparatus 100, lower cost is achieved through the benefit of sharing the storage in other devices. The images displayed at step 840 may represent still pictures and/or a video sequence of moving pictures.

As previously indicated, the user may select the manner in which the selected images are displayed, at step 840, when an incoming communication, such as a phone call from the corresponding phone number, is received by telecommunications apparatus 100. For example, the selected images may be displayed at step 840 as a slide show. The slide show may be display the images one at a time in a rotating manner. The images may also be displayed all at once in a full screen mode, or as a mosaic of some or all of the selected images where thumbnails of the images can be of equal or unequal sizes, with any number of transition effects and/or different angular display orientations. In this manner, the temporal order that one or more of the selected images is displayed at step 840 and/or the time period that one or more of the selected images is displayed at step 840 may be controlled based on prior selections. According to at least one exemplary embodiment, when the images are displayed one at a time in a rotating manner as a slide show at step 840, processor 14 may cause either the display or the rotation of the images to be interrupted in response to detecting a predetermined condition, such as communication is received or completed. In an exemplary embodiment, the sequential display rotation of images are started when a user answers the phone call and halted upon completion of the phone call, such as when the user hangs up. An advantage of allowing the interruption is to allow the user, for instance, to quickly change the display to another set of images, upon receiving a new phone call, or to alert the user of new information, such as the CID, regarding an incoming call.

Also as previously indicated, the user may designate where the selected images are to be displayed at step 840 when an incoming phone call from the corresponding phone number is received by telecommunications apparatus 100. For example, images may be displayed at step 840 via display 18 of telecommunications apparatus 100 and/or via one or more other devices (e.g., base station 250, a computer monitor, a television screen, etc.). In addition to images, the caller's phone number and name may also be displayed via display 18 at step 840.

As described, the present embodiments provide a method and apparatus for providing a communications device feature that links or associates images with a record, such as a phone record for a caller. While the embodiments have been described as having a preferred design, the present embodiments can be further modified within the spirit and scope of this disclosure. This application is therefore intended to cover any variations, uses, or adaptations of the invention using its general principles. Further, this application is intended to cover such departures from the present disclosure as come within known or customary practice in the art to which the present disclosure pertains and which fall within the limits of the appended claims.

What is claimed is:

1. A method for linking images to a phone record, the method comprising the steps of:
    comparing data associated with a plurality of images with data associated with a phone record including a caller name and caller phone number used for a caller identification;
    receiving a selection of a mode from a plurality of modes for linking at least a photographic image from said plurality of images to said phone record, wherein the selection of the mode is subsequent to a selection of the phone record;
    linking said photographic image from said plurality of images to said phone record if at least a portion of the data associated with said photographic image matches at least a portion of the data associated with said phone record based on the selected mode for linking; and
    displaying said photographic image with said caller identification on a called party device while receiving an incoming call.

2. The method of claim 1, further comprising the step of:
    displaying said image in response to receiving a communication from a user associated with said phone record.

3. The method of claim 2, further comprising the step of:
    interrupting said display of said image in response to completing said communication.

4. The method of claim 3, wherein said communication is a phone call.

5. The method of claim 1 wherein said step of linking includes the step of linking two or more images.

6. The method of claim 5 further comprising the step of:
    sequentially displaying said two or more images.

7. The method of claim 6, wherein said step of displaying further includes the step of enabling a user to select a time period that at least one of said two or more images is displayed.

8. The method of claim 6, wherein said step of displaying further includes the step of enabling a user to select an order of display of said at two or more images.

9. The method of claim 1, wherein said step of linking further includes the step of enabling a user to select said image.

10. The method of claim 1, wherein said step of linking further includes the step of displaying a group of images having at least one keyword that matches at least one keyword of said record.

11. The method of claim 1, wherein said step of linking further includes the step of displaying an image with the most associated keywords that match keywords associated with said record.

12. The method of claim 1, wherein said step of linking further includes the step of enabling a user to modify a parameter related to said displaying of said image.

13. The method of claim 1, wherein said data associated with said phone record includes at least one of a caller name, caller phone number, filename, date, and metadata.

14. An apparatus, comprising:
    a memory for storing a phone record and data associated with said phone record including a caller name and caller phone number used for a caller identification;
    a processor coupled to said memory for comparing said data associated with said phone record and data associated with a plurality of images, receiving a selection of a mode from a plurality of modes for linking at least a photographic image from said plurality of images to said phone record and linking said photographic image from said plurality of images to said phone record based on the mode selected if at least a portion of the data associated with said image matches at least a portion of the data associated with said record, wherein the selection of the mode is subsequent to a selection of the phone record; and
    a display coupled to said processor for displaying said photographic image with said caller identification on a called party device while receiving an incoming call.

15. The apparatus of claim 14, wherein said processor further enables display of said image in response to one of a user receiving a communication using said apparatus and said user completing said communication using said apparatus.

16. The apparatus of claim 14, wherein said display is in a base unit of said apparatus.

17. The apparatus of claim 16, wherein said image is communicated between said base unit and a handset after said image is linked to said record.

18. The apparatus of claim 14, wherein said apparatus is a telecommunications device.

19. The apparatus of claim 16 wherein said processor is further configured to link two or more images.

20. The apparatus of claim 19 wherein the display sequentially displays said two or more images.

21. The apparatus of claim 20 wherein sequentially displaying the said to or more images further includes enabling a user to select a time period that at least one of said two or more images is displayed.

22. The apparatus of claim 20 wherein said sequentially displaying further includes enabling a user to select an order of display of said at two or more images.

23. The apparatus of claim 16 wherein said processor is further configured to enable a user to select said image.

24. The apparatus of claim 16 wherein said linking further includes displaying a group of images having at least one keyword that matches at least one keyword of said record.

25. The apparatus of claim 16 wherein said linking further includes displaying an image with the most associated keywords that match keywords associated with said record.

26. The apparatus of claim 16 wherein said linking further includes enabling a user to modify a parameter related to said displaying of said image.

27. The apparatus of claim 16 wherein said data associated with said phone record includes at least one of a caller name, caller phone number, filename, date, and metadata.

* * * * *